United States Patent
Zhang et al.

(10) Patent No.: US 10,959,261 B2
(45) Date of Patent: Mar. 23, 2021

(54) SYSTEM AND METHOD FOR PILOT ASSISTED GRANT-FREE UPLINK TRANSMISSION IDENTIFICATION

(71) Applicants: Liqing Zhang, Nepean (CA); Yu Cao, Kanata (CA)

(72) Inventors: Liqing Zhang, Nepean (CA); Yu Cao, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 58 days.

(21) Appl. No.: 15/088,607

(22) Filed: Apr. 1, 2016

(65) Prior Publication Data
US 2017/0290052 A1 Oct. 5, 2017

(51) Int. Cl.
*H04W 74/00* (2009.01)
*H04L 1/18* (2006.01)
*H04J 11/00* (2006.01)

(52) U.S. Cl.
CPC ......... *H04W 74/004* (2013.01); *H04L 1/1896* (2013.01); *H04J 11/004* (2013.01); *H04L 1/1812* (2013.01)

(58) Field of Classification Search
CPC ... H04W 28/04; H04W 72/04; H04W 72/042; H04W 88/08; H04L 5/0007
See application file for complete search history.

(56) References Cited

U.S. PATENT DOCUMENTS

| 8,804,580 B2 * | 8/2014 | Anderson | H04W 72/0413 370/252 |
| 8,837,311 B2 * | 9/2014 | Martin | H04L 1/0001 370/252 |
| 9,743,423 B2 * | 8/2017 | Liu | H04W 72/1268 |
| 9,775,141 B2 * | 9/2017 | Nimbalker | H04W 72/0413 |

(Continued)

FOREIGN PATENT DOCUMENTS

| CN | 101374038 A | 2/2009 |
| CN | 101577614 A | 11/2009 |

(Continued)

OTHER PUBLICATIONS

Wikipedia, Hybrid automatic repeat request, Jan. 29, 2020.*

*Primary Examiner* — Peter G Solinsky
*Assistant Examiner* — Sanjay K Dewan

(57) ABSTRACT

System and methods are disclosed in which pilots are used to assist in identifying grant-free uplink transmissions originating from the same UE. In one embodiment, a base station receives a grant-free uplink transmission that carries initial data from a user equipment and an initial pilot. The initial pilot is successfully decoded and the initial data is unsuccessfully decoded. The successfully decoded initial pilot and the unsuccessfully decoded initial data are stored in memory. Another grant-free uplink transmission carrying retransmission data from the user equipment and a retransmission pilot is then received. The retransmission pilot is successfully decoded and used to identify the successfully decoded initial pilot in the memory and the unsuccessfully decoded initial (Continued)

302

| Index for 3-tuple | {P1} Initial Tx | {P2} 1st Re-Tx | {P3} 2nd Re-Tx |
|---|---|---|---|
| 1 | p11 | p21 | p31 |
| 2 | p12 | p22 | p32 |
| 3 | p13 | p23 | p33 |

304

| Index for 3-tuple | {P1} Initial Tx | {P2} 1st Re-Tx | {P3} 2nd Re-Tx |
|---|---|---|---|
| 1 | p11 | p21 | p31 |
| 2 | p12 | p21 | p31 |
| 3 | p13 | p22 | p32 |
| 4 | p14 | p22 | p32 |
| 5 | p15 | p21 | p32 |

306

| Index for 3-tuple | {P1} Initial Tx | {P2} 1st Re-Tx | {P3} 2nd Re-Tx |
|---|---|---|---|
| 1 | p11 | p21 | p21 |
| 2 | p12 | p21 | p21 |
| 3 | p13 | p22 | p22 |
| 4 | p14 | p22 | p22 |
| 5 | p15 | p23 | p23 |
| 6 | p16 | p23 | p23 | data. The retransmission data and the unsuccessfully decoded initial data are used to successfully decode the initial data.

29 Claims, 8 Drawing Sheets

(56) References Cited

U.S. PATENT DOCUMENTS

| | | | | |
|---|---|---|---|---|
| 2009/0122758 | A1* | 5/2009 | Smith | H04L 1/1887 |
| | | | | 370/330 |
| 2009/0147688 | A1* | 6/2009 | Matsumoto | H04J 11/0056 |
| | | | | 370/242 |
| 2009/0274109 | A1* | 11/2009 | Zhang | H04L 5/0007 |
| | | | | 370/329 |
| 2013/0170456 | A1* | 7/2013 | Novak | H04W 72/042 |
| | | | | 370/329 |
| 2013/0265948 | A1* | 10/2013 | Lee | H04W 72/042 |
| | | | | 370/329 |
| 2013/0272258 | A1* | 10/2013 | Lee | H04W 72/0413 |
| | | | | 370/329 |
| 2013/0279459 | A1* | 10/2013 | Lee | H04L 5/0091 |
| | | | | 370/329 |
| 2014/0140336 | A1 | 5/2014 | Callard et al. | |
| 2014/0192767 | A1* | 7/2014 | Au | H04W 72/0413 |
| | | | | 370/330 |
| 2014/0254544 | A1* | 9/2014 | Kar Kin Au | H04L 1/0038 |
| | | | | 370/330 |
| 2014/0314004 | A1* | 10/2014 | Zhou | H04L 1/1671 |
| | | | | 370/329 |
| 2015/0236823 | A1 | 8/2015 | Djukic et al. | |
| 2016/0134438 | A1* | 5/2016 | Marzetta | H04L 25/0228 |
| | | | | 370/315 |

FOREIGN PATENT DOCUMENTS

| | | | | |
|---|---|---|---|---|
| CN | 101888289 | A | 11/2010 | |
| CN | 104683081 | A | 6/2015 | |
| CN | 105284172 | A | 1/2016 | |
| EP | 2114029 | A1 * | 11/2009 | H04L 1/0001 |
| WO | 20100130187 | A1 | 11/2010 | |

* cited by examiner

302

| Index for 3-tuple | {P1}<br>Initial Tx | {P2}<br>1st Re-Tx | {P3}<br>2nd Re-Tx |
|---|---|---|---|
| 1 | p11 | p21 | p31 |
| 2 | p12 | p22 | p32 |
| 3 | p13 | p23 | p33 |

304

| Index for 3-tuple | {P1}<br>Initial Tx | {P2}<br>1st Re-Tx | {P3}<br>2nd Re-Tx |
|---|---|---|---|
| 1 | p11 | p21 | p31 |
| 2 | p12 | p21 | p31 |
| 3 | p13 | p22 | p32 |
| 4 | p14 | p22 | p32 |
| 5 | p15 | p21 | p32 |

306

| Index for 3-tuple | {P1}<br>Initial Tx | {P2}<br>1st Re-Tx | {P3}<br>2nd Re-Tx |
|---|---|---|---|
| 1 | p11 | p21 | p21 |
| 2 | p12 | p21 | p21 |
| 3 | p13 | p22 | p22 |
| 4 | p14 | p22 | p22 |
| 5 | p15 | p23 | p23 |
| 6 | p16 | p23 | p23 |

FIG. 3

| Scenario | Initial Pilot from {P1} Detected? | Data Successfully Decoded? | 1st Re-Tx Pilot from {P2} Detected? | Data Successfully Decoded in 1st Re-Tx? | Data Successfully Decoded by Combining Initial and 1st Re-Tx Data? | 2nd Re-Tx Pilot from {P3} Detected? | Data Successfully Decoded in 2nd Re-Tx? | Data Successfully Decoded by Combining 2nd Re-Tx Data with 1st Re-Tx and/or Initial Data? |
|---|---|---|---|---|---|---|---|---|
| 1 | ✓ | ✓ | N/A | N/A | N/A | N/A | N/A | N/A |
| 2 | ✓ | ✗ | ✓ | ✓ | N/A | N/A | N/A | N/A |
| 3 | ✓ | ✗ | ✓ | ✗ | ✓ | N/A | N/A | N/A |
| 4 | ✗ | ✗ | ✓ | ✓ | N/A | N/A | N/A | N/A |
| 5 | ✗ | ✗ | ✓ | ✗ | ✗ | ✓ | ✓ | N/A |
| 6 | ✗ | ✗ | ✓ | ✗ | ✗ | ✓ | ✗ | ✓ |
| 7 | ✓ | ✗ | ✓ | ✗ | ✗ | ✓ | ✓ | N/A |
| 8 | ✓ | ✗ | ✓ | ✗ | ✗ | ✓ | ✗ | ✓ |
| 9 | ✗ | ✗ | ✗ | ✗ | ✗ | ✓ | ✓ | N/A |

SYSTEM AND METHOD FOR PILOT ASSISTED GRANT-FREE UPLINK TRANSMISSION IDENTIFICATION

FIELD

The present application relates to grant-free uplink transmissions.

BACKGROUND

In some wireless communication systems, a user equipment (UE) wirelessly communicates with a base station to send data to the base station and/or receive data from the base station. A wireless communication from a UE to a base station is referred to as an uplink communication, and a wireless communication from a base station to a UE is referred to as a downlink communication.

Resources are required to perform uplink and downlink communications. For example, a UE may wirelessly transmit data to a base station in an uplink transmission at a particular frequency and/or during a particular slot in time. The frequency and time slot used are examples of resources.

In some wireless communication systems, if a UE wants to transmit data to a base station, the UE requests uplink resources from the base station. The base station grants the uplink resources, and then the UE sends the uplink transmission using the granted uplink resources. An example of uplink resources that may be granted by the base station is a set of time/frequency locations in an uplink orthogonal frequency-division multiple access (OFDMA) frame.

The base station is aware of the identity of the UE sending the uplink transmission using the granted uplink resources, because the base station specifically granted those uplink resources to that UE. However, there may be schemes in which the base station does not know which UE, if any, is going to send an uplink transmission using certain uplink resources. An example is a grant-free uplink transmission scheme in which UEs may send uplink transmissions using certain uplink resources shared by the UEs, without specifically requesting use of the resources and without specifically being granted the resources by the base station. The base station will therefore not know which UE, if any, is going to send a grant-free uplink transmission using the resources. Also, assuming there is no coordination amongst the UEs, then two or more UEs may each send a respective grant-free uplink transmission using the same resources, causing a collision.

SUMMARY

System and methods are disclosed in which pilots are used to assist in identifying grant-free uplink transmissions originating from the same UE.

In one embodiment, a method performed by a base station is provided. The method may include receiving a grant-free uplink transmission on an uplink channel. The grant-free uplink transmission carries initial data from a UE and an initial pilot for channel estimation of the uplink channel. The method may further include successfully decoding the initial pilot and unsuccessfully decoding the initial data. The method may further include storing in memory the successfully decoded initial pilot and the unsuccessfully decoded initial data. The method may further include receiving another grant-free uplink transmission carrying retransmission data from the UE and a retransmission pilot used for uplink channel estimation. The method may further include successfully decoding the retransmission pilot. The method may further include using the successfully decoded retransmission pilot to identify the successfully decoded initial pilot in the memory and the unsuccessfully decoded initial data associated with the successfully decoded initial pilot. The method may further include retrieving the unsuccessfully decoded initial data from the memory. The method may further include using the retransmission data and the unsuccessfully decoded initial data to successfully decode the initial data.

In another embodiment, a base station is provided. The base station may include at least one antenna, a memory, and a grant-free transmission module. The base station may be configured to receive a grant-free uplink transmission on an uplink channel. The grant-free uplink transmission carries initial data from a UE and an initial pilot for channel estimation of the uplink channel. The base station may be configured to attempt to decode the initial pilot and the initial data. When the initial pilot is successfully decoded and the initial data is unsuccessfully decoded, the base station may be configured to store in the memory the successfully decoded initial pilot and the unsuccessfully decoded initial data. The base station may be configured to receive another grant-free uplink transmission carrying retransmission data from the UE and a retransmission pilot used for uplink channel estimation. The base station may be configured to attempt to decode the retransmission pilot. When the retransmission pilot is successfully decoded, the base station may be configured to use the successfully decoded retransmission pilot to identify the successfully decoded initial pilot in the memory and the unsuccessfully decoded initial data associated with the successfully decoded initial pilot. The base station may be configured to retrieve the unsuccessfully decoded initial data from the memory. The base station may be configured to use the retransmission data and the unsuccessfully decoded initial data to successfully decode the initial data.

In another embodiment, a method performed by a UE is provided. The method may include transmitting a grant-free uplink transmission on an uplink channel. The grant-free uplink transmission carries initial data and an initial pilot to be used for channel estimation of the uplink channel. The method may include selecting a retransmission pilot usable for uplink channel estimation and associated with the initial pilot such that the initial pilot can be identified from the retransmission pilot, and transmitting a subsequent grant-free uplink transmission carrying retransmission data and the retransmission pilot.

In another embodiment, a UE is provided. The UE may include at least one antenna and/or a grant-free transmission module. The UE may be configured to transmit a grant-free uplink transmission on an uplink channel. The grant-free uplink transmission carries initial data and an initial pilot to be used for channel estimation of the uplink channel. The UE may be configured to select a retransmission pilot usable for uplink channel estimation and associated with the initial pilot such that the initial pilot can be identified from the retransmission pilot, and transmit a subsequent grant-free uplink transmission carrying retransmission data and the retransmission pilot.

Other aspects and features will become apparent to those of ordinary skill in the art upon review of the following description.

BRIEF DESCRIPTION OF THE DRAWINGS

Embodiments will be described, by way of example only, with reference to the accompanying figures wherein:

FIG. 3 illustrates three tables, each showing an example way to partition a pool of nine pilots into three sets;

FIG. 4 illustrates a table summarizing nine scenarios in which data sent in a grant-free uplink transmission is successfully decoded at the base station;

DETAILED DESCRIPTION

For illustrative purposes, specific example embodiments will now be explained in greater detail below in conjunction with the figures.

Figure 1:
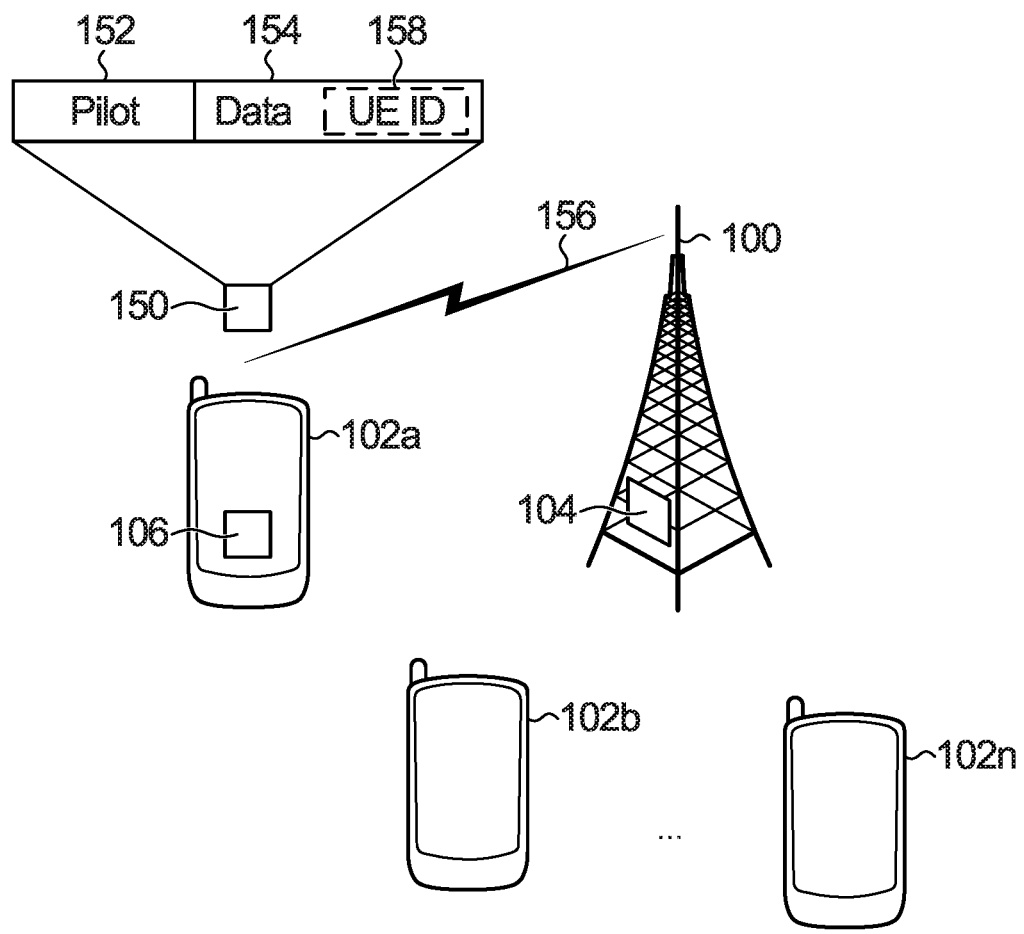
FIG. 1 is a block diagram of a base station and a plurality of UEs, according to one embodiment.

FIG. 1 is a block diagram of a base station 100 and a plurality of UEs 102a-n, according to one embodiment. The base station 100 includes a grant-free transmission module 104 that is described in more detail below. Each one of the UEs 102a-n also includes a respective grant-free transmission module. For example, grant-free transmission module 106 of UE 102a is illustrated in FIG. 1 and will be described in more detail below.

The term "base station" encompasses any device that wirelessly receives data in the uplink from UEs. Therefore, in some implementations, the base station 100 may be called other names, such as a transmit point, a transmit and receive point, a base transceiver station, a radio base station, a network node, a transmit node, a Node B, an eNode B, a relay station, or a remote radio head. Also, in some embodiments, the parts of the base station 100 are distributed. For example, some of the modules of the base station 100 may be located remote from the equipment housing the antennas of the base station 100, and may be coupled to the equipment housing the antennas over a communication link.

In operation, UEs 102a-n may each send grant-free uplink transmissions to the base station 100. A grant-free uplink transmission is an uplink transmission that is made using uplink resources not specifically requested from the base station 100 and not specifically granted to the UE by the base station 100. For example, the base station 100 may allocate certain resources, such as a designated area in an OFDMA frame, for grant-free uplink transmissions. The UEs 102a-n may use the designated resources to send their grant-free uplink transmissions, but the base station 100 does not know which of the UEs 102a-n, if any, are going to send a grant-free uplink transmission in the allocated resources. If a grant-free uplink transmission is received and the data of the grant-free uplink transmission is successfully decoded, then the base station 100 may determine from the successfully decoded data which UE made the grant-free uplink transmission.

Grant-free uplink transmissions are sometimes called "grant-less", "schedule free", or "schedule-less" transmissions. Grant-free uplink transmissions from different UEs 102a-n may be transmitted using the same designated resources, in which case the grant-free uplink transmissions are contention-based transmissions. One or more base stations, e.g. base station 100, may perform blind detection on the grant-free uplink transmissions.

Grant-free uplink transmissions may be suitable for transmitting bursty traffic with short packets from the UEs 102a-n to the base station 100, and/or for transmitting data to the base station 100 in real-time or with low-latency. Examples of applications in which a grant-free uplink transmission scheme may be utilized include: massive machine type communication (m-MTC), ultra-reliable low latency communications (URLLC), smart electric meters, teleprotection in smart grids, and autonomous driving. However, grant-free uplink transmission schemes are not limited to the applications described above.

A message 150 sent by UE 102a in a grant-free uplink transmission over uplink channel 156 is illustrated in FIG. 1. The message 150 includes a pilot 152 and data 154. The pilot 152 is to be decoded by the base station 100 and used by the base station 100 for channel estimation of uplink channel 156 between the UE 102a and the base station 100. To facilitate successful decoding of the pilot 152, the pilot 152 may be transmitted with a low modulation and coding scheme (MCS). The data 154 includes an identity 158 of the UE 102a so that when the data 154 is successfully decoded by the base station 100, the base station 100 is informed of which UE the grant-free transmission came from, and can send an acknowledgement (ACK) to the UE 102a in the downlink indicating that the base station 100 has successfully decoded the data 154. In some embodiments, the identify 158 of the UE 102a is embedded in a cyclic redundancy check (CRC) of the message 150, which may reduce the payload size of the data 154.

Ideally, the base station 100 is able to successfully decode pilot 152, successfully decode data 154, obtain the identity 158 of UE 102a, and then send an ACK to UE 102a. However, the quality of the uplink channel 156, and/or a collision with another grant-free uplink transmission from another one of UEs 102b-n using the same uplink resources, may corrupt the grant-free uplink transmission of message 150 from UE 102a and cause one of two scenarios to occur: (1) the pilot 152 may be successfully decoded by the base station 100, but the data 154 may be unsuccessfully decoded by the base station 100; or (2) not even the pilot 152 can be successfully decoded by the base station 100, in which case the data 154 is also unsuccessfully decoded by the base station 100. In both scenarios (1) and (2) the base station 100 cannot send a negative acknowledgement (NACK) to the UE 102a, because the base station 100 is not even aware of which UE sent the message 150, because the base station 100 cannot successfully decode the data 154 to obtain the identification 158 of the UE 102a. However, in scenario (1) the UE 102a has at least successfully decoded the pilot 152 and therefore can use the successfully decoded pilot 152 to assist in identifying other transmissions or retransmissions for the unsuccessfully decoded data 154 in the manner explained below.

Figure 2:
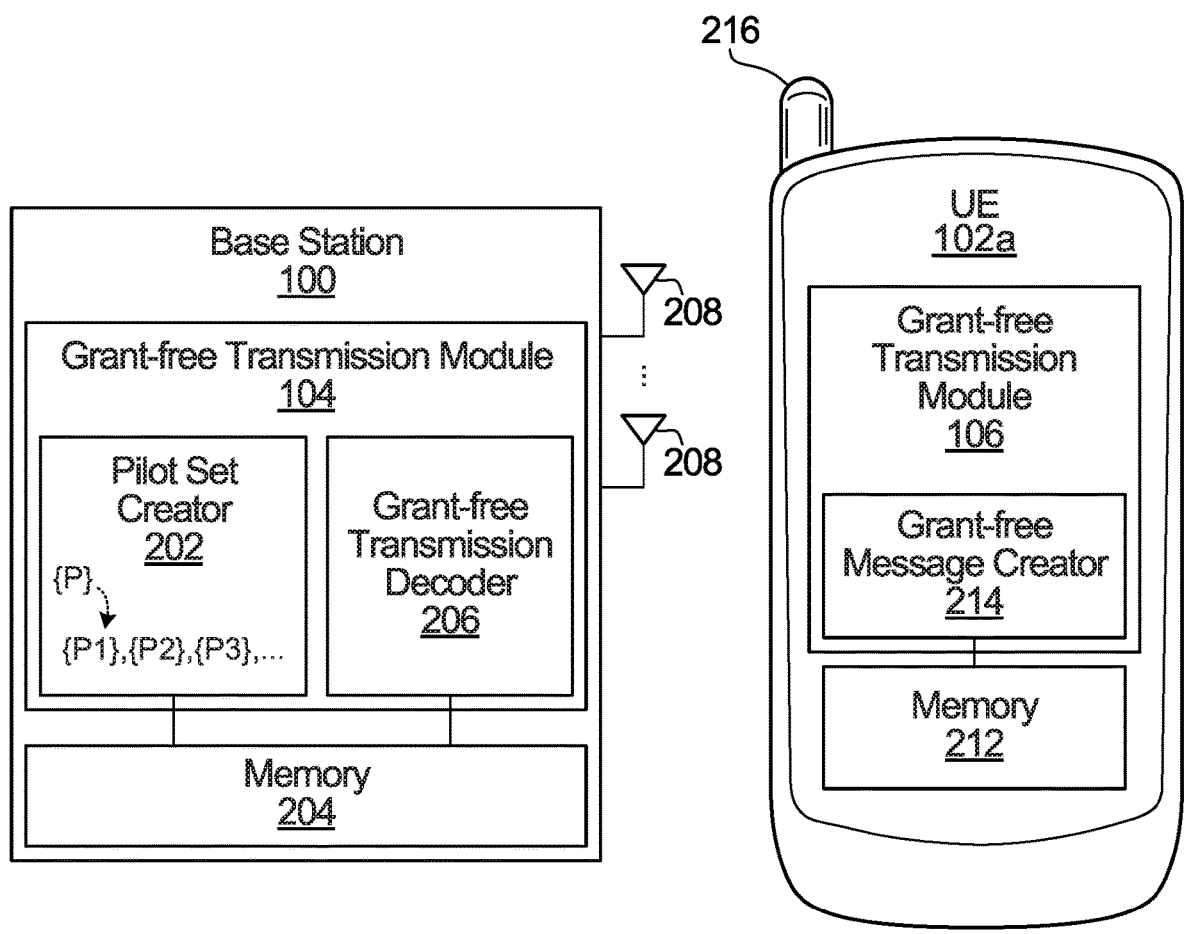
FIG. 2 is a block diagram showing the base station and a UE of FIG. 1 in more detail, according to one embodiment.

FIG. 2 is a block diagram showing the base station 100 and UE 102a of FIG. 1 in more detail, according to one embodiment. The grant-free transmission module 104 of the base station 100 includes a pilot set creator 202 for dividing a pool of pilots into a set of initial transmission pilots and one or more sets of retransmission pilots. In this embodiment, pilot set creator 202 specifically divides a pool of pilots {P} into a set of pilots {P1} to be used when sending an initial transmission of data, another set of pilots {P2} to be used when sending a first retransmission of data, and another set of pilots {P3} to be used when sending a second retransmission of data. {P1} will be called the set of initial pilots, {P2} will be called the set of $1^{st}$ retransmission pilots, and {P3} will be called the set of $2^{nd}$ retransmission pilots.

The pilots used when sending retransmissions may be divided into more than two sets to support more than two retransmissions.

Each pilot in the set of initial pilots $\{P1\}$ is associated with a corresponding pilot in the set of $1^{st}$ retransmission pilots $\{P2\}$ and a corresponding pilot in the set of $2^{nd}$ retransmission pilots $\{P3\}$, such that a tuple may be defined for each pilot in the set of initial pilots $\{P1\}$. In this embodiment, each tuple is a 3-tuple that includes the initial pilot from $\{P1\}$, the corresponding pilot in $\{P2\}$, and the corresponding pilot in $\{P3\}$. The tuples may also be called mapping rules, and the tuples and the pilot sets are stored in a memory 204 of the base station 100.

In some embodiments, the pilot set creator 202 divides the pool of pilots into exclusive pilot sets: $\{P_i\} \cap \{P_j\} = \emptyset$, $i \neq j$. For example, if the pool of pilots $\{P\}$ includes nine pilots, then the pilot set creator 202 may divide the nine pilots into three exclusive pilots sets $\{P1\}$, $\{P2\}$, and $\{P3\}$, where $\{P1\} \cup \{P2\} \cup \{P3\} = \{P\}$, $\{P1\} \cap \{P2\} = \emptyset$, $\{P1\} \cap \{P3\} = \emptyset$, and $\{P2\} \cap \{P3\} = \emptyset$. In other embodiments, the pilot set creator 202 divides the pool of pilots into sets such that a retransmission pilot is associated with multiple initial pilots and/or multiple previous retransmission pilots.

FIG. 3 illustrates three tables 302, 304, and 306, each showing an example way to partition a pool $\{P\}$ of nine pilots into sets $\{P1\}$, $\{P2\}$, and $\{P3\}$. Each row in each table represents a 3-tuple. In table 302, the pool $\{P\}$ is divided into three exclusive sets $\{P1\}$, $\{P2\}$, and $\{P3\}$, such that each set has three of the nine pilots. Specifically, $\{P1\}$ includes pilots p11, p12, and p13, $\{P2\}$ includes pilots p21, p22, and p23, and $\{P3\}$ includes pilots p31, p32, and p33. Three of the nine pilots are designated as initial pilots, another three of the nine pilots are designated as $1^{st}$ retransmission pilots, and the last three of the nine pilots are designated as $2^{nd}$ retransmission pilots. There are three 3-tuples in table 302, which have respective indices 1, 2, and 3. The pilot mapping scheme in table 302 is one-to-one mapping because each 3-tuple has a unique sequence of pilots.

In table 304, the pool $\{P\}$ of nine pilots is divided into three sets $\{P1\}$, $\{P2\}$, and $\{P3\}$, such that there are more than three unique pilots in the set of initial pilots $\{P1\}$. Fewer unique pilots are in sets $\{P2\}$ and $\{P3\}$ compared to the number of unique pilots in set $\{P1\}$. Therefore, a pilot is reused in different 3-tuples, and so there is one-to-multiple mapping between the pilots in the three sets. For example, the 3-tuple labelled by index 1 is (p11, p21, p31), the 3-tuple labelled by index 2 is (p12, p21, p31), and the 3-tuple labelled by index 5 is (p15, p21, p32). As can be seen from these three 3-tuples, the $1^{st}$ retransmission pilot p21 is associated with three different initial pilots: p11, p12, and p15. The $2^{nd}$ retransmission pilot p31 is associated with $1^{st}$ retransmission pilot p21 and two initial transmission pilots p11 and p12.

In table 306, the pool $\{P\}$ of nine pilots is divided into three sets $\{P1\}$, $\{P2\}$, and $\{P3\}$, such that there are even more unique pilots in the initial pilot set $\{P1\}$ compared to table 304. In this example, there is again one-to-multiple mapping, but the same pilots are used in each retransmission set $\{P1\}$ and $\{P2\}$. A pilot is reused twice in each 3-tuple. For example, the 3-tuple labelled by index 1 is (p11, p21, p21) and the 3-tuple labelled by index 2 is (p12, p21, p21). As can be seen from these two 3-tuples, pilot p21 is associated with two different initial pilots: p11 and p12, and pilot 21 may be a $1^{st}$ retransmission pilot or a $2^{nd}$ retransmission pilot.

Returning to FIG. 2, the grant-free transmission module 104 of the base station 100 further includes a grant-free transmission decoder 206. The grant-free transmission decoder 206 decodes grant-free transmissions received from the UEs 102*a-n* in the manner described below. The base station 100 also includes one or more antennas 208 for receiving grant-free uplink transmissions from the UEs 102*a-n* and sending messages to the UEs 102*a-n* in the downlink. The base station 100 includes other components for operation, e.g. to implement the physical layer, but these have been omitted for the sake of clarity.

The grant-free transmission module 104 may be implemented by one or more processors (not illustrated) that execute instructions that cause the one or more processors to perform the operations of the grant-free transmission module 104, the pilot set creator 202 and the grant-free transmission decoder 206 described herein. Alternatively, the grant-free transmission module 104 may be implemented using dedicated integrated circuitry (not illustrated), such as an application specific integrated circuit (ASIC), a graphics processing unit (GPU), or a programmed field programmable gate array (FPGA) for performing the operations of the grant-free transmission module 104, the pilot set creator 202 and the grant-free transmission decoder 206 described herein.

The UE 102*a* includes memory 212 for storing initial and retransmission pilot sets $\{P1\}$, $\{P2\}$, and $\{P3\}$, as well as the mapping rules, i.e., the tuples, providing the mapping between the retransmission pilots and the initial pilots. The grant-free transmission module 106 of the UE 102*a* includes a grant-free message creator 214 for creating messages to be transmitted in grant-free uplink transmissions. Each message includes either initial data or retransmission data, along with an appropriate pilot selected from pilot sets $\{P1\}$, $\{P2\}$, and $\{P3\}$ stored in memory 212. The UE 102*a* further includes an antenna 216 for transmitting grant-free uplink transmissions and receiving messages from the base station 100 in the downlink. The UE 102*a* includes other components for operation, e.g. to implement the physical layer, but these have been omitted for the sake of clarity.

The grant-free transmission module 106 may be implemented by one or more processors (not illustrated) that execute instructions that cause the one or more processors to perform the operations of the grant-free transmission module 106 and the grant-free message creator 214 described herein. Alternatively, the grant-free transmission module 106 may be implemented using dedicated integrated circuitry (not illustrated), such as an ASIC, a GPU, or an FPGA for performing the operations of the grant-free transmission module 106 and the grant-free message creator 214 described herein.

In operation, the pilot set creator 202 of the base station 100 divides a pool of pilots into a set of initial pilots $\{P1\}$ and one or more sets of retransmission pilots, e.g., a set of $1^{st}$ retransmission pilots $\{P2\}$ and a set of $2^{nd}$ retransmission pilots $\{P3\}$. The pilot set creator 202 defines the mapping between each initial pilot and the retransmission pilots, e.g., creates the 3-tuples for the case of $\{P1\}$, $\{P2\}$, and $\{P3\}$. The mapping between each initial pilot and the retransmission pilots is included as mapping information in a message. The grant free transmission module 104 then instructs the base station 100 to transmit the message having the mapping information to the UEs 102*a-n*. The base station 100 and the UEs 102*a-n* therefore each have knowledge of the pilots and tuples. In some embodiments, the grant free transmission module 104 also instructs the base station 100 to transmit the initial and retransmission pilot sets to the UEs 102*a-n*. In other embodiments, the UEs 102*a-n* already have the pool of pilots {P} and the UEs 102*a-n* divide the pool of pilots {P} into the initial and retransmission pilot sets created by the pilot set creator 202 using the received mapping information.

Referring back to FIG. 1 with further reference to FIG. 2, when UE 102*a* wants to transmit data 154 to the base station 100 using a grant-free uplink transmission, then the grant-free message creator 214 creates message 150 including the data 154 and an initial pilot 152 from set {P1}. An initial pilot is selected because this is the initial transmission of data 154. The grant-free transmission module 106 of the UE 102*a* then instructs the UE 102*a* to transmit the message 150. The base station 100 receives the message 150, but unless the data 154 can be successfully decoded at the base station 100, the base station 100 does not know which of the UEs 102*a-n* sent the message 150. However, the base station 100 does know which resources were used to carry the pilot 152 and data 154, because this is preconfigured in advance. The base station 100 forwards the message 150 to the grant-free transmission module 104 of the base station 100. The grant-free transmission decoder 206 first attempts to decode the pilot 152. The decoded pilot 152 is used for channel estimation of uplink channel 156. If the pilot 152 is successfully decoded and channel estimation of the uplink channel 156 is performed, then the grant-free transmission decoder 206 attempts to decode the data 154. If the data 154 is successfully decoded, then the identity 158 of the UE 102*a* is provided to the grant-free transmission module 104 of the base station 100. The grant-free transmission module 104 instructs the base station 100 to send an ACK to the UE 102*a* indicating that the data 154 has been successfully decoded.

However, if the message 150 is corrupted during the uplink transmission such that not even the pilot 152 can be successfully decoded, then the grant-free transmission decoder 206 discards the whole message 150. A NACK cannot be sent to UE 102*a* because the base station 100 does not know which one of the UEs 102*a-n* sent the message 150.

Because the pilot 152 may be sent with a low MCS compared to the data 154, it may be the case that the grant-free transmission decoder 206 is able to successfully decode the pilot 152, but the grant-free transmission decoder 206 is not able to successfully decode the data 154. If the data 154 is not successfully decoded, then a NACK cannot be sent to UE 102*a* because the base station 100 does not know which of the UEs 102*a-n* sent the message. However, if the pilot 152 has been successfully decoded, then the grant-free transmission decoder 206 stores the successfully decoded pilot 152 and the unsuccessfully decoded data 154 in the memory 204.

Meanwhile, after the UE 102*a* sends the message 150, the grant-free transmission module 106 of the UE 102*a* waits a predetermined duration of time to receive an ACK from the base station 100. In one embodiment, a timer (not illustrated) may be started after the message 150 is sent, and if the timer expires before the ACK is received, then the predetermined duration of time has elapsed. If an ACK is received before the predetermined duration of time has elapsed, then the grant-free transmission module 106 determines that the data 154 was successfully decoded at the base station 100. If no ACK is received before the predetermined duration of time has elapsed, then it could be because of two reasons: (1) the data 154 was successfully decoded at the base station and an ACK was transmitted, but the ACK was not successfully received at the UE 102*a*; or (2) an ACK was never sent from the base station 100 because the data 154 was not successfully decoded. In any case, the grant-free message creator 214 creates a new message having retransmission data corresponding to initial data 154. The retransmission data may be identical to the initial data 154, or the retransmission data may be a subset of the initial data 154 and/or other data, e.g. parity or redundancy information that pertains to the initial data 154. As one example, the retransmission data may be another redundancy version (RV) of the initial data 154. The grant-free message creator 214 then selects a retransmission pilot to send with the retransmission data in a retransmission message, and instructs the UE 102*a* to send the retransmission message in a grant-free uplink transmission.

The base station 100 receives the retransmission message and forwards the retransmission message to the grant-free transmission module 104 of the base station 100. If the retransmission message is corrupted such that the grant-free transmission decoder 206 cannot successfully decode the retransmission pilot, then the retransmission message is discarded. If the retransmission pilot is successfully decoded, then the successfully decoded retransmission pilot may not only be used for uplink channel estimation, but is also used by the grant-free transmission decoder 206 to identify the successfully decoded initial pilot 152 and the unsuccessfully decoded initial data 154 in the memory 204. Because the mapping between each initial pilot and the retransmission pilots was created by the pilot set creator 202 and is therefore known to the grant-free transmission module 104, the grant-free transmission decoder 206 is able to identify the unsuccessfully decoded initial data 154 as being from the same UE as the retransmission data, because the unsuccessfully decoded initial data 154 is associated with the successfully decoded initial pilot 152, and the initial pilot 152 maps to the retransmission pilot in the retransmission message. If the retransmission data is unsuccessfully decoded by the grant-free transmission decoder 206, then the grant-free transmission decoder 206 may combine the unsuccessfully decoded initial data 154 and the unsuccessfully decoded retransmission data, to successfully decode the initial data 154. One type of combining that may be used is soft combining, such as chase combining or incremental redundancy. If the retransmission data is successfully decoded, then the successfully decoded retransmission data may be combined with the unsuccessfully decoded initial data to successfully decode the initial data. If the retransmission data is successfully decoded and is a full retransmission of the initial data, then the grant-free transmission decoder 206 may not need to retrieve the unsuccessfully decoded initial data at all because the successfully decoded retransmission data is the successfully decoded initial data. In any case, if the successfully decoded initial data is obtained, then the grant-free transmission module 104 causes the base station 100 to send an ACK to the UE 102*a*. Otherwise, if the successfully decoded initial data is not obtained, then no ACK can be sent and, if the retransmission pilot was successfully decoded, then the retransmission pilot and the unsuccessfully decoded retransmission data is stored in memory 204.

If no ACK is received at the UE 102*a*, then the UE 102*a* keeps transmitting retransmission messages, each one using a pilot from the next retransmission pilot set, until either an ACK is received or the maximum number of allowable retransmissions is reached. At the base station 100, when each additional retransmission is received, and the retransmission pilot is successfully decoded, then the successfully decoded retransmission pilot is used to identify associated transmissions from the same UE and combining is performed. An ACK is transmitted if the initial data can be successfully decoded.

In the operation described above, the base station 100 may receive a different initial transmission from another one of UEs 102b-n before receiving the retransmission from UE 102a. In this case, if the different initial transmission happens to use the same initial pilot as that used by UE 102a, then when the retransmission is received at the base station 100, the base station 100 will not know which initial transmission is associated with the received retransmission. The base station 100 may need to perform blind decoding, e.g., soft combine the retransmission with the initial transmission received first, and if decoding is unsuccessful, then next soft combine the retransmission with the initial transmission received second.

A specific example will now be described. In the example, there are nine pilots, two retransmissions are permitted, and the pilot set creator 202 creates three exclusive pilot sets with the one-to-one mapping relationship illustrated in table 302 of FIG. 3. FIG. 4 illustrates a table 402 summarizing nine scenarios in which data sent in a grant-free uplink transmission is successfully decoded at the base station 100. In this example the data sent in any retransmission is identical to the data sent in the initial transmission, such that successfully decoding the data of either an initial transmission or a retransmission is all that is needed to obtain the data.

In scenario 1 of table 402 there is no retransmission required because the data sent in the initial transmission is successfully decoded. In some scenarios, like scenario 2 of table 402, a retransmission is required, but the pilot is not used to identify a previous transmission and there is no combining with previous unsuccessfully decoded versions of the data, because the data is successfully decoded in the retransmission. In some scenarios, like scenario 3, a retransmission is required, but the retransmission data is combined with the initial transmission data to decode the data. The specific example described below will follow scenario 8 of table 402.

Figure 5A:
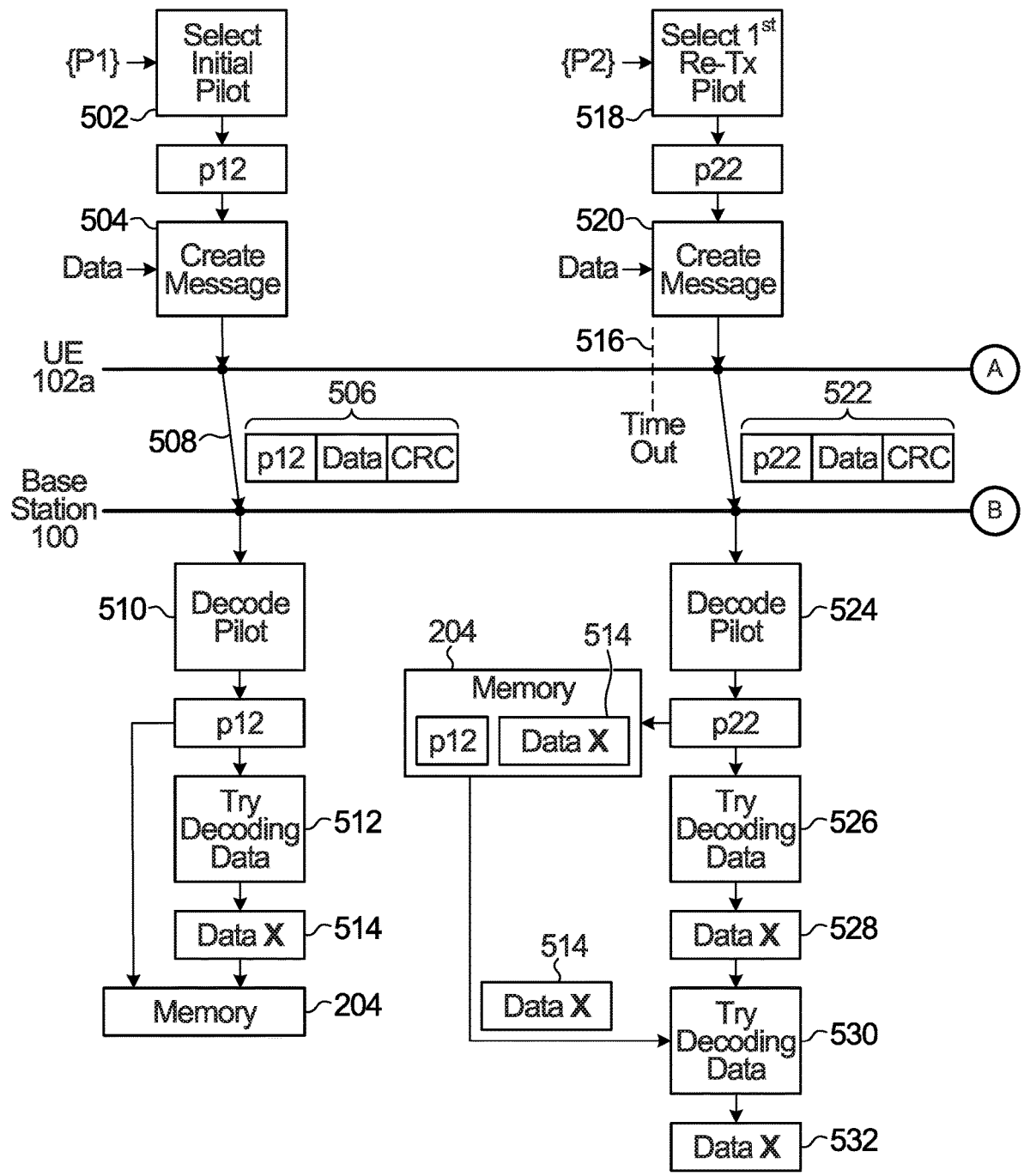
FIG. 5, consisting of FIGS. 5A and 5B, is a flowchart illustration of scenario 8 in the table of FIG. 4.
Figure 5B:
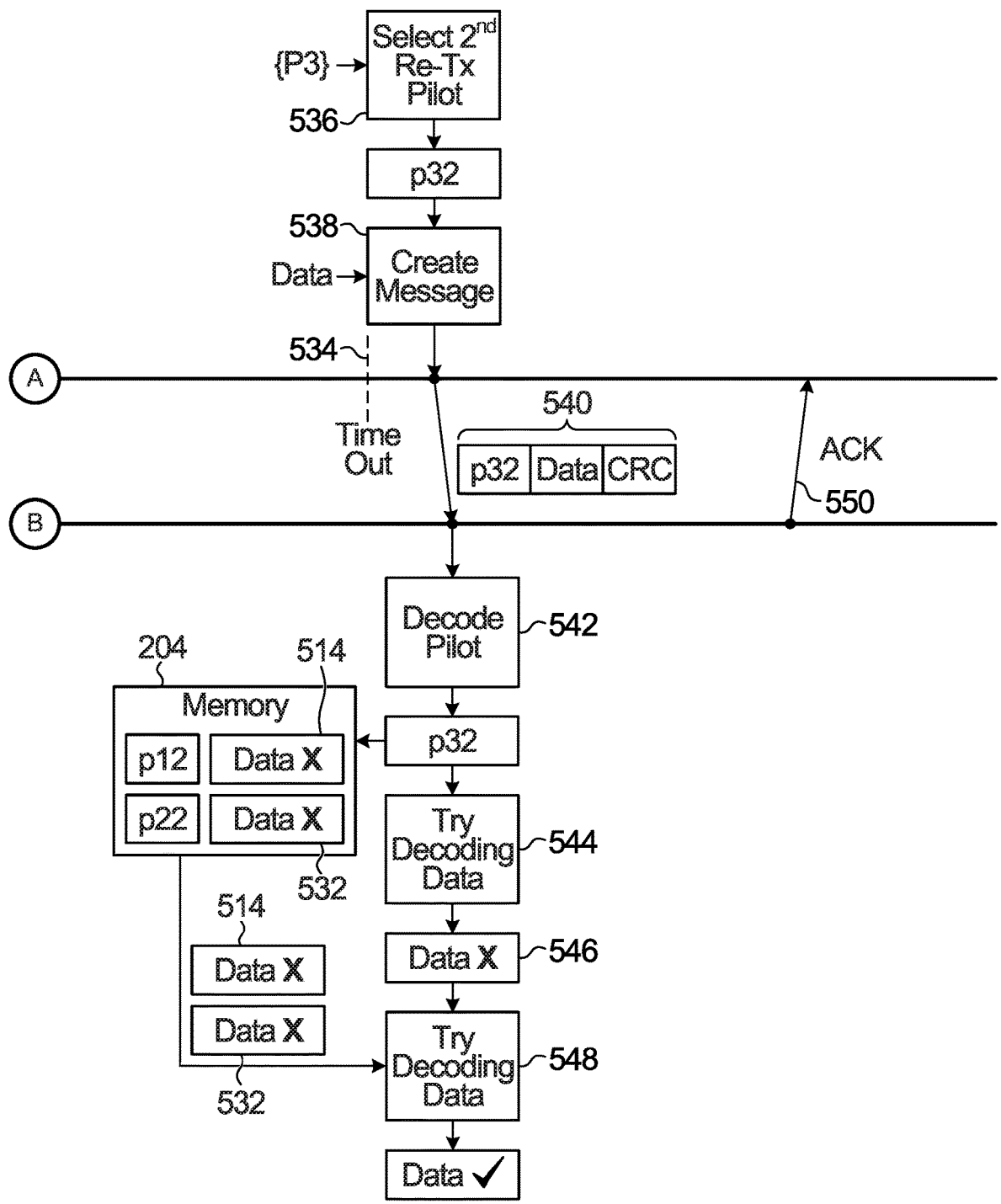

FIG. 5, consisting of FIGS. 5A and 5B, is a flowchart illustration of scenario 8 in table 402 of FIG. 4. The grant-free message creator 214 first selects an initial pilot from set {P1}, as shown at 502. In this example, pilot p12 is selected, which is the initial pilot of the 3-tuple shown in row 2 of table 302 in FIG. 3. As shown at 504, the grant-free message creator 214 then creates an initial message 506 from the data and the pilot p12. The initial message 506 includes a CRC for detecting whether the data is successfully decoded. As shown at 508, the initial message 506 is transmitted in a grant-free uplink transmission to the base station 100. The base station 100 receives the message 506, and the grant-free transmission decoder 506 successfully decodes the pilot p12 at 510. The grant-free transmission decoder 206 uses the pilot p12 to perform channel estimation of the uplink channel and then tries to decode the data at 512. The data is unsuccessfully decoded and is stored in memory 204 as unsuccessfully decoded data 514 associated with successfully decoded pilot p12.

Meanwhile, the UE 102a waits for an ACK but does not receive one before a predetermined duration of time expires, as shown at 516. The grant-free message creator 214 therefore selects the $1^{st}$ retransmission pilot p22 from set {P2}, as shown at 518. Pilot p22 is associated with pilot p21 through the 3-tuple defining the mapping relationship. As shown at 520, the grant-free message creator 214 then creates $1^{st}$ retransmission message 522 from the data and the $1^{st}$ retransmission pilot p22. The $1^{st}$ retransmission message 522 is transmitted in a grant-free uplink transmission to the base station 100. The base station 100 receives the message 522 and the grant-free transmission decoder 206 successfully decodes the pilot p22 at 524. The grant-free transmission decoder 206 uses the pilot p22 to perform channel estimation of the uplink channel and then tries to decode the data at 526. However, only unsuccessfully decoded data 528 is obtained. The grant-free transmission decoder 206 therefore uses the pilot p22 to identify the successfully decoded initial pilot p12 and the associated unsuccessfully decoded data 514 in memory 204. The grant-free transmission decoder 206 then, at 530, tries decoding the data again by combining the unsuccessfully decoded initial data 514 and the unsuccessfully decoded $1^{st}$ retransmission data 528, e.g. using chase combining. The data is still unsuccessfully decoded and is stored in memory 204 as unsuccessfully decoded data 532 associated with successfully decoded pilot p22.

Meanwhile, the UE 102a waits for an ACK but does not receive one before a predetermined duration of time expires, as shown at 534. The grant-free message creator 214 therefore selects the $2^{nd}$ retransmission pilot p32 from set {P3}, as shown at 536. Pilot p32 is associated with pilots p21 and p22 through the 3-tuple defining the mapping relationship. As shown at 538, the grant-free message creator 214 then creates $2^{nd}$ retransmission message 540 from the data and the $2^{nd}$ retransmission pilot p32. The $2^{nd}$ retransmission message 540 is transmitted in a grant-free uplink transmission to the base station 100. The base station 100 receives the message 540 and the grant-free transmission decoder 206 successfully decodes the pilot p32 at 542. The grant-free transmission decoder 206 uses the pilot p32 to perform channel estimation of the uplink channel and then tries to decode the data at 544. However, only unsuccessfully decoded data 546 is obtained. The grant-free transmission decoder 206 therefore uses the pilot p32 to identify the successfully decoded initial pilot p21 and the associated unsuccessfully decoded data 514 in memory 204, as well as the successfully decoded $1^{st}$ retransmission pilot p22 and the associated unsuccessfully decoded data 532 in memory 204. The grant-free transmission decoder 206 then, at 548, tries decoding the data again by combining the unsuccessfully decoded initial data 514, the unsuccessfully decoded $1^{st}$ retransmission data 532, and the unsuccessfully decoded $2^{nd}$ retransmission data 546, e.g. using chase combining. The data is successfully decoded. An ACK is then sent to the UE 102, as shown at 550.

Figure 6:
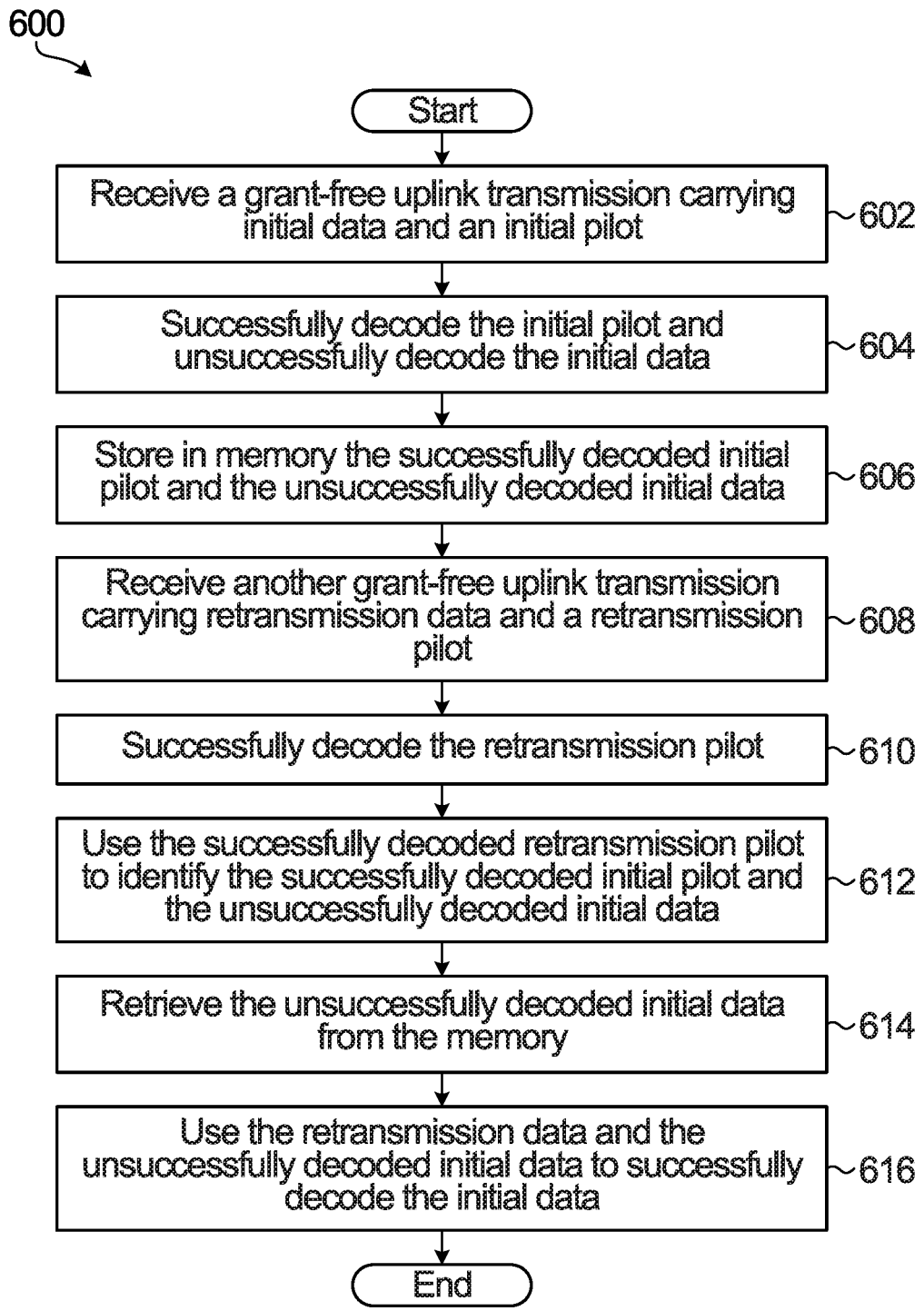
FIG. 6 is a flowchart of a method performed by a base station, according to one embodiment.

FIG. 6 is a flowchart of a method performed by base station 100 according to one embodiment. In step 602, the base station 100 receives a grant-free uplink transmission on an uplink channel. The grant-free uplink transmission carries initial data from UE 102a and an initial pilot for channel estimation of the uplink channel. In step 604, the base station 100 successfully decodes the initial pilot and unsuccessfully decodes the initial data. In step 606, the base station 100 stores in memory 204 the successfully decoded initial pilot and the unsuccessfully decoded initial data. In step 608, the base station 100 receives another grant-free uplink transmission carrying retransmission data from the UE 102a and a retransmission pilot used for uplink channel estimation. In step 610, the base station 100 successfully decodes the retransmission pilot.

In step 612, the base station 100 uses the successfully decoded retransmission pilot to identify the successfully decoded initial pilot in the memory and the unsuccessfully decoded initial data associated with the successfully decoded initial pilot. As shown in the examples above, step 612 may involve using a mapping, known by the base station 100, between the successfully decoded retransmission pilot and the successfully decoded initial pilot to identify the successfully decoded initial pilot. In the examples above, the initial pilot is from a set of initial transmission pilots, the retransmission pilot is from a set of retransmission pilots, and mapping information between the set of initial transmission pilots and the set of retransmission pilots is known by the base station. The mapping information may include, for each pilot in the set of initial transmission pilots, a mapping between the pilot in the set of initial transmission pilots and a pilot in the set of retransmission pilots. The mapping information may be in the form of tuples. The number of unique pilots in the set of initial transmission pilots may be the same as or exceed the number of unique pilots in the set of retransmission pilots. The mapping information would include the mapping between the successfully decoded retransmission pilot and the successfully decoded initial pilot. The mapping information may be transmitted to the UE 102*a*.

In step 614, the base station 100 retrieves the unsuccessfully decoded initial data from the memory. In step 616, the base station 100 uses the retransmission data and the unsuccessfully decoded initial data to successfully decode the initial data.

The method of FIG. 6 may further include unsuccessfully decoding the retransmission data, and step 616 may include combining the unsuccessfully decoded retransmission data and the unsuccessfully decoded initial data. Soft combining may be used. Alternatively, the retransmission data may be successfully decoded, but may not be identical to the initial data, e.g. the retransmission data may include some redundancy bits pertaining to the initial data. The combining may then include using the information of the successfully decoded retransmission data to supplement the unsuccessfully decoded initial data and thereby successfully decode the initial data.

The method of FIG. 6 may further include receiving at least one other grant-free uplink transmission from at least one other of the UEs 102*b-n*, the at least one other grant-free uplink transmission using resources that are the same as resources used by the grant-free uplink transmission of UE 102*a*. The successfully decoded initial data may be used to perform successive interference cancellation (SIC) to assist in decoding data of the at least one other grant-free uplink transmission.

The grant-free uplink transmission received in step 608 may be a second retransmission, in which case the retransmission data is second retransmission data and the retransmission pilot is a second retransmission pilot. The method of FIG. 6 may further include using the successfully decoded second retransmission pilot to also identify a successfully decoded first retransmission pilot in the memory 204 and unsuccessfully decoded first retransmission data associated with the successfully decoded first retransmission pilot. Step 616 may include combining the unsuccessfully decoded first retransmission data, the unsuccessfully decoded second retransmission data, and the unsuccessfully decoded initial data to successfully decode the initial data.

The method of FIG. 6 may further include identifying the user equipment from the successfully decoded initial data, and sending an acknowledgement to the user equipment.

Figure 7:
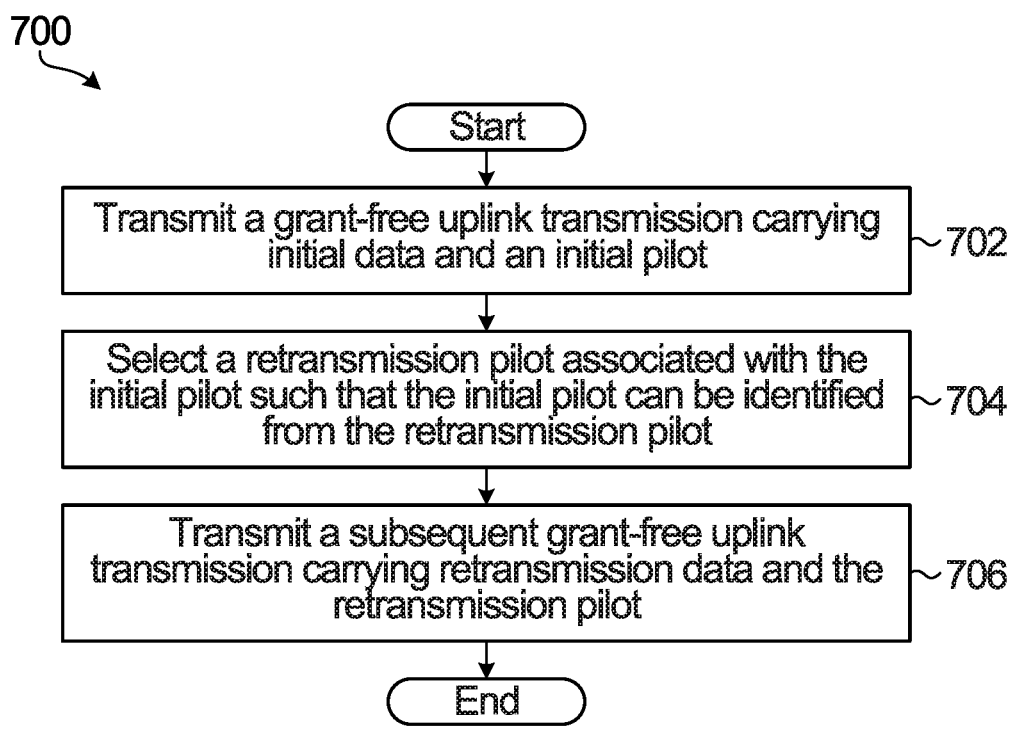
FIG. 7 is a flowchart of a method performed by a UE, according to one embodiment.

FIG. 7 is a flowchart of a method performed by UE 102*a* according to one embodiment. In step 702, the UE 102*a* transmits a grant-free uplink transmission on an uplink channel. The grant-free uplink transmission carries initial data and an initial pilot to be used for channel estimation of the uplink channel. In step 704, the UE 102*a* selects a retransmission pilot usable for uplink channel estimation and associated with the initial pilot such that the initial pilot can be identified from the retransmission pilot. As shown in the examples above, step 704 may involve using a mapping, known by the UE 102*a*, between the initial pilot and the retransmission pilot to identify the retransmission pilot. In the examples above, the initial pilot is from a set of initial transmission pilots, the retransmission pilot is from a set of retransmission pilots, and mapping information between the set of initial transmission pilots and the set of retransmission pilots is known by the UE 102*a*. The mapping information may include, for each pilot in the set of initial transmission pilots, a mapping between the pilot in the set of initial transmission pilots and a pilot in the set of retransmission pilots. The mapping information would include the mapping between the initial pilot and the retransmission pilot. The mapping information may be received from the base station 100.

In step 706, the UE 102*a* then transmits a subsequent grant-free uplink transmission carrying retransmission data and the retransmission pilot.

In some embodiments, after step 702 the UE 102*a* waits for an ACK indicating that the initial data has been successfully decoded, and steps 704 and 706 are only performed if the ACK is not received within a predetermined duration of time. Alternatively, the UE 102*a* may not have time to wait for an ACK, or may not want to wait for the ACK, and the UE 102*a* may perform steps 704 and 706 shortly after making the initial transmission.

Embodiments in which steps 704 and 706 are performed without waiting for an ACK may be useful in URLLC applications. The number of retransmissions may be dynamically determined by the UE 102*a* based on the application or the traffic quality-of-service (QoS). For example, if the latency constraint of an application for the UE 102*a* is 5 ms, e.g. 5 transmission time intervals (TTIs), then the UE 102*a* may send an initial transmission of the data using an initial pilot on the first TTI, then send a first retransmission of the data on the second TTI, and then send a second retransmission of the data on the third TTI. The UE 102*a* would not wait to see if an ACK is received before sending a retransmission. The initial and two retransmissions may be soft combined at the base station 100. The first retransmission may be sent a predetermined duration of time after the initial transmission, the second retransmission may be sent a predetermined duration of time after the first retransmission, and so on. The predetermined duration of time may change between each transmission.

In the FIG. 7 embodiment, the retransmission pilot may be a first retransmission pilot. The method may further include: after transmitting the subsequent grant-free uplink transmission carrying the first retransmission pilot and the retransmission data, waiting for the acknowledgement indicating that the initial data has been successfully decoded. If the acknowledgement is not received within a predetermined duration of time, then selecting a second retransmission pilot usable for uplink channel estimation and associated with the initial pilot and the first retransmission pilot such that the initial pilot and the first retransmission pilot can be identified from the second retransmission pilot. Another grant-free uplink transmission may be sent carrying second retransmission data and the second retransmission pilot.

In the embodiments described above, the pilots may be orthogonal sequences, e.g., orthogonal Zadoff-Chu (ZC) sequences. Alternatively, the pilots may be non-orthogonal sequences. Alternatively, the pilots may include both orthogonal and non-orthogonal sequences. A possible benefit of using orthogonal sequences is that if there are two or more transmissions from different UEs 102a-n using the same resources, and the pilots used by each of the UEs are different and orthogonal, then collision of the pilots will not occur and successful decoding of the pilots at the base station 100 may be more likely. A possible benefit of using some or all non-orthogonal sequences is that more pilot sequences may be available in the pool of pilots {P}, which may reduce the likelihood that two different UEs choose the same pilot. In some embodiments an orthogonal cover code (OCC) is applied to the pilot sequences to enlarge the number of available pilots in pool {P}. In some embodiments, non-orthogonal pilots based on different ZC roots are used to increase the number of available pilots in pool {P}. Having a large number of pilots may be beneficial in applications in which a large number of UEs are all using shared resources to send grant-free uplink transmissions.

In some embodiments, the number of unique pilots included in the set of initial pilots {P1} exceeds the number of unique pilots in each of the retransmission pilot sets {P2}, {P3}, . . . . For example, in table 304 in FIG. 3, there are five unique pilots in the initial pilot set {P1}, but as a result there are fewer unique pilots in retransmission pilot sets {P2} and {P3}, because the total number of unique pilots is fixed at nine. In table 306 in FIG. 3, there are six unique pilots in the initial pilot set {P1}, but as a result there are even fewer unique pilots in retransmission pilot sets {P2} and {P3}. The way in which the pilots in pool {P} are divided into the initial and retransmission pilot sets represents a trade-off between: (i) the number of unique pilots available in the initial pilot set {P1}, and (ii) potential decoding complexity at the base station 100 when a retransmission of the data is required. In the example shown in table 302 of FIG. 3, the pool of nine pilots {P} is divided into three exclusive sets {P1}, {P2}, and {P3}. There is a one-to-one mapping between each pilot in {P1} and the corresponding pilots in {P2} and {P3}. Therefore, when a pilot is successfully decoded at the base station 100, the base station 100 knows from the pilot whether the pilot is associated with an initial transmission of the data or a $1^{st}$ retransmission of the data or a $2^{nd}$ retransmission of the data, and the base station 100 can use the successfully decoded pilot to exactly identify which other transmissions were from the same UE because there is a one-to-one mapping between the successfully decoded pilot and the other pilot in each one of the other pilot sets corresponding to the successfully decoded pilot.

In the example shown in table 306 of FIG. 3, the pool of nine pilots {P} is divided into sets {P1}, {P2}, and {P3}, but there are more unique pilots in the initial pilot set {P1} compared to retransmission sets {P2} and {P3}. When a retransmission pilot is decoded at the base station 100, the base station 100 knows it is a retransmission pilot, but does not know if the retransmission pilot is associated with a $1^{st}$ retransmission of the data or a $2^{nd}$ retransmission of the data. Depending upon which other previous transmissions are stored at the base station 100, blind decoding may need to be performed by combining the retransmission data with each one of multiple previous unsuccessfully decoded data transmissions until the data is unsuccessfully decoded. For example, if the pilots are divided in the way shown in table 306 of FIG. 3, and if the base station 100 receives a grant-free uplink transmission and successfully decodes the pilot p21 and unsuccessfully decodes the data D associated with pilot p21, then the base station 100 knows that data D is a retransmission from a UE that sent initial data with either pilot p11 or pilot p12. However, the base station 100 does not know whether the retransmission is a $1^{st}$ retransmission or a $2^{nd}$ retransmission. If stored in memory 204 at the base station 100 is: decoded pilot p11 and associated unsuccessfully decoded data d11, decoded pilot p12 and associated unsuccessfully decoded data d12, and decoded pilot p21 and associated unsuccessfully decoded data d21, then it is not clear whether the data D is a retransmission corresponding to d11 or d12, and it is not clear whether the data D is a $2^{nd}$ retransmission corresponding to data d21. In this example the decoding at the base station would involve trying multiple combinations until successful decoding resulted, e.g. combining D with d11, combining D with d21, combining D with d21 and d11, and combining D with d21 and d21. Alternatively, if only decoded pilot p11 and associated unsuccessfully decoded data d11 was stored in memory 204, then decoding is no more complex than in the example in table 302, because there is only one previous transmission, data d11, to combine with.

The potential drawback of the example shown in table 306 of FIG. 3 is that in general decoding may be more complex when retransmission is required compared to the example shown in table 302 of FIG. 3. However, the potential benefit of the example shown in table 306 is that there are more unique pilots in the initial pilot set {P1} compared to the number of unique pilots in initial pilot set {P1} in the example shown in table 302. Therefore, in the example shown in table 306, it may be less likely that two of UEs 102a-n use the same pilot when both sending a grant-free uplink initial transmission using the same resources thereby causing a collision. Also, if an initial transmission of data is successfully decoded most of the time, then decoding retransmissions will not happen as often.

The example shown in table 304 of FIG. 3 is a compromise between the examples shown in tables 302 and 306. In the example shown in table 304 there is not one-to-one mapping, but there are more than three unique pilots in {P1,} and the pilots assigned to {P2} are different from the pilots assigned to {P3}, so that the base station 100 will know whether a received pilot is associated with an initial transmission, a $1^{st}$ retransmission, or a $2^{nd}$ retransmission of the data.

Tables 302, 304, and 306 are only examples. Other mapping schemes may be used. Also, all pilots in the initial pilot set {P1} may not necessarily be unique, particularly if there are a large number of UEs and only a small number of pilots. For example, table 306 may be modified to have another row, i.e. another tuple, indexed as tuple 7. The $7^{th}$ tuple may be (p11, p22, p22). Multiple tuples may be added to table 306, as long as each tuple is different from each other.

In the embodiments described above, asynchronous retransmission by the UEs 102a-n is possible. For example, a retransmission of data by UE 102a may only occur when an ACK is not received before the expiry of a timer, and the retransmission does not have to be at a set time interval after an initial transmission or previous retransmission. In some embodiments, the retransmission may occur after a retransmission back-off window. For example, instead of UE 102a sending a retransmission as soon as the timer expires, the UE 102a may choose a random time longer to wait before sending the retransmission. This may help mitigate collision of retransmission pilots. For example, if two of the UEs 102a-n both happen to use the same initial pilot and the same transmission resources, then a collision of the initial pilot will occur, but if those two UEs then send a retransmission at a different random time in the future then collision of the retransmission pilots of each user will not occur. In some embodiments, the back-off window may be increased as a function of the number of retransmissions of the data. In FIG. 7, the method may therefore further include waiting for a duration of a back-off window before transmitting the subsequent grant-free uplink transmission in step 706.

In one embodiment, all the pilots in a pool of pilots {P} may be assigned to the initial pilot set {P1} and all the retransmission pilot sets, i.e. {P1}={P2}={P3}= . . . ={P}. In this embodiment, the number of unique pilots in the initial transmission set {P1} would equal the number of unique pilots in pool {P}, which may mitigate pilot collision by reducing the probability of two UEs 102*a-n* using the same initial pilot to send an initial grant-free uplink transmission using the same resources. However, decoding at the base station 100 when there are retransmissions may be complex due to the potential amount of blind decoding that may be required. Therefore, this embodiment is envisioned as being better suited to schemes in which retransmissions are synchronous, e.g., when any retransmission is required the retransmission is made X ms after the initial transmission, and any subsequent retransmission is made X ms after the previous retransmission, where X is known a priori to the UEs 102*a-n* and the base station 100. Therefore, if the combining of multiple unsuccessfully decoded data transmissions is to be performed at the base station 100, the base station 100 may be able to determine possible transmissions from the same UE by looking to previous transmissions received at a multiple of X ms before the present transmission.

In some embodiments, the retransmission resource allocations may change to introduce diversity between the initial and retransmissions. For example, one area of time-frequency resources in a TTI may be for initial transmissions, and another area of time-frequency resources in the TTI may be for retransmissions. The time-frequency resources used for initial and retransmissions may be flexible and time-varying. A retransmission may be combined with time/frequency hopping. IR combining may be best suited to diversity between the transmissions. Alternatively, the time-frequency locations may be fixed. In any case, the base station 100 may provide to the UEs 102*a-n* information indicating which resource are to be used for which transmissions along with the pilot mapping information.

In some embodiments, the base station 100 receives a grant-free uplink transmission having a pilot and data, and the base station 100 is able to successfully decode the pilot, but not the data sent with the pilot. The base station 100 may then broadcast to the UEs 102*a-n* a message indicating that the pilot of a grant-free uplink transmission has been successfully decoded, but the data sent with that pilot has not been successfully decoded. The message includes the identity of the successfully decoded pilot. The message will be called a "pilot ACK". The UE that sent the grant-free uplink transmission determines that the identity of the decoded pilot in the pilot ACK is the same as the pilot used by the UE in the grant-free uplink transmission. Upon this determination, the UE performs a retransmission of the data to the base station 100 in a subsequent grant-free uplink transmission. In some embodiments, the UE waits for a random back-off window before performing the retransmission.

As an example, UE 102*a* and UE 102*b* both independently perform a grant-free uplink transmission using pilot p11. UE 102*a* and 102*b* then each receive a pilot ACK broadcast from the base station 100 indicating that a pilot p11 was decoded successfully, but that the data sent with pilot p11 was not decoded successfully. UE 102*a* determines that pilot p11 in the pilot ACK is the same pilot used in the grant-free uplink transmission from UE 102*a*. In response, UE 102*a* performs a retransmission of the data that was previously sent with pilot p11 from UE 102*a*, but this time UE 102*a* uses retransmission pilot p21. UE 102*b* also determines that pilot p11 in the pilot ACK is the same pilot used in the grant-free uplink transmission from UE 102*b*. In response, UE 102*b* performs a retransmission of the data that was previously sent with pilot p11 from UE 102*b*, but this time UE 102*b* uses retransmission pilot p21. If UE 102*a* and 102*b* both wait a random back-off window before performing the retransmission, then this may avoid a collision of the retransmissions. In any case, retransmission by UE 102*a* and UE 102*b* is triggered by receiving the pilot ACK and determining that the pilot identified in the pilot ACK is the same pilot used by UE 102*a* and 102*b* to make a grant-free uplink transmission. It is therefore possible that a retransmission may occur sooner compared to if UE 102*a* and UE 102*b* instead each wait until a retransmission timer expires, e.g. as in step 516 of FIG. 5A, before sending a retransmission. If a pilot ACK is received before the retransmission timer expires, then the retransmission may be made before the retransmission timer expires. A possible benefit is that retransmission delay may be reduced. A possible drawback is that additional overhead is required to support the transmission of pilot ACKs.

In the embodiments described above, the base station 100 broadcasts a pilot ACK to all UEs 102*a-n*, because the base station 100 is unable to successfully decode the data sent with the successfully decoded pilot, and so the base station 100 does not know which UE sent the grant-free uplink transmission. Alternatively, the base station 100 may know that only certain UEs can use certain pilots, in which case the base station 100 may broadcast the pilot ACK to only the UEs that could have used the pilot.

The base station 100 may receive multiple grant-free uplink transmissions for which the pilot is successfully decoded, but the data is not successfully decoded. The base station 100 may then broadcast a single pilot ACK that identifies the successfully decoded pilot for each of the multiple grant-free uplink transmissions. A single pilot ACK may be used to identify successfully decoded initial pilots, or successfully decoded retransmission pilots, or both successfully decoded initial pilots and successfully decoded retransmission pilots. The initial and retransmission pilots may be from multiple UEs, in which case the multiple UEs will each perform a respective retransmission upon receiving the pilot ACK. However, if the maximum number of allowed retransmissions has been reached by a particular UE, then the particular UE will not make another retransmission.

A pilot ACK is different from an ACK that indicates that data from a UE has been successfully decoded. An ACK indicating that data from a UE has been successfully decoded will be referred to as a "UE ACK". A UE ACK will typically be transmitted from the base station 100 to a particular UE in a unicast transmission. A pilot ACK will typically be broadcast from the base station 100 to multiple UEs. In some embodiments, if a base station 100 has to send a pilot ACK and a UE ACK, the pilot ACK may be sent before the UE ACK or at the same time as the UE ACK. In some embodiments, a single broadcast message may be used to send both a UE ACK and a pilot ACK, in which case a separate UE ACK does not need to be transmitted by the base station 100.

In some embodiments, different pilots may be associated with different MCS for the data. For example, pilots from set {P1} may be associated with data transmitted having a high MCS, such as a MCS index of 14, pilots from set {P2} may be associated with data transmitted having a medium MCS, such as an MCS index of 7, and pilots from set {P3} may be associated with data transmitted with a low MCS, such as an MCS index of 2. Then, when UE 102*a* sends an initial transmission, an initial pilot from set {P1} is selected and the initial data is transmitted with the high MCS. If a $1^{st}$ retransmission is required, a $1^{st}$ retransmission pilot from set {P2} is selected and the $1^{st}$ retransmission data is transmitted with the medium MCS. If a $2^{nd}$ retransmission is required, a $2^{nd}$ retransmission pilot from set {P3} is selected and the $2^{nd}$ retransmission data is transmitted with the low MCS. When the base station 100 successfully decodes the pilot, the base station may determine from the identity of the pilot which set the pilot is from and hence the MCS of the data transmitted with the pilot. In these embodiments, the MCS associated with each set of pilots may be determined by the base station 100 and communicated to UEs 102*a-n* along with the pilot mapping information. With reference to the methods of FIGS. 6 and 7, the initial data may have a first MCS associated with the initial pilot, and the retransmission data may have a second MCS associated with the retransmission pilot. The first MCS may be higher than the second MCS.

In some embodiments, different pilots within each of the pilot sets may have different data MCS's associated with them. As one example, some of the initial pilots for initial transmissions may use 8-QAM and a code rate of ½ for data transmitted with those initial pilots, and others of the initial pilots may use another MCS for data transmitted with those initial pilots. The $1^{st}$ retransmission pilots may be associated with QPSK and a code rate of ½ for data transmitted with the $1^{st}$ retransmission pilots, and the $2^{nd}$ retransmission pilots may be associated with BPSK and a code rate of ½ for data transmitted with the $2^{nd}$ retransmission pilots.

In some embodiments, the pilot tuples may be partitioned into different groups, and each group of pilot tuples may be associated with a different MCS for the data. Then, when data is sent with a pilot from a particular group, the data uses the MCS associated with that group. Information would be stored at the UEs 102*a-n* and the base station 100 indicating which tuples belong to which groups and the data MCS associated with each group. By associating a different data MCS for each group of tuples, grant-free link adaption may be achieved to possibly enhance the data transmission spectrum efficiency. For example, based on each UE's relatively long-term channel measurement, e.g., using location based geometry, UEs with relatively poor channel conditions, such as cell edge users, can employ one group of the pilot tuples associated with a more robust data MCS, and UEs with relatively good channel conditions, such as cell center users, can employ other groups of the pilot tuples associated with less robust, but more spectrum efficient, MCS for their data transmissions.

With reference to the methods of FIGS. 6 and 7, the pilot tuples are known by the UE 102*a* and the base station 100, and the initial pilot and the retransmission pilot are from the same tuple. The tuples may be partitioned into groups of tuples, with each group of tuples having an associated MCS that is used for transmitting data with pilots from that group. The MCS may be different for at least two of the groups. In some embodiments, a given group of tuples may have a first data MCS used for any initial data transmissions that use initial pilots from the group and a second data MCS used for any data retransmissions that use retransmission pilots from the group. The first data MCS may be higher than the second data MCS so that the MCS is more robust for data retransmissions. The first data MCS and the second data MCS for one group of tuples may be different from a corresponding first data MCS and second data MCS for another group of tuples.

In some embodiments, different pilots may be associated with different UE transmit power. For example, pilots from set {P1} may be associated with a low transmit power for transmitting the data, pilots from set {P2} may be associated with a medium transmit power for transmitting the data, and pilots from {P3} may be associated with a high transmit power for transmitting the data. The UE 102*a* chooses the appropriate transmit power based on what pilot is being used. In these embodiments, the transmit power associated with each set of pilots may be determined by the base station 100 and communicated to UEs 102*a-n* along with the pilot mapping information. In some embodiments, different pilots within each of the pilot sets may have different UE transmit power associated with them. In some embodiments, the maximum transmit power may be capped by a threshold. In some embodiments, a boost power offset may be configurable and increased as a function of each retransmission. With reference to the methods of FIGS. 6 and 7, the initial data may be transmitted with a first transmit power associated with the initial pilot, and the retransmission data may be transmitted with a second transmit power associated with the retransmission pilot.

In embodiments in which the MCS is lowered and/or the power is increased with each subsequent retransmission, it may be more likely that the data is successfully decoded with each subsequent retransmission. Also, in embodiments in which a different MCS and/or a different power is associated with different transmissions, the change in MCS and/or power may only apply to the data portion of the transmission. The pilot may always be transmitted with a fixed power and MCS that is robust enough to allow for successful decoding of the pilot in different channel conditions.

When a pilot is successfully decoded, but the data associated with the pilot is unsuccessfully decoded, the pilot and unsuccessfully decoded data is stored in memory 204. It may be the case that the unsuccessfully decoded data is never used, e.g. if subsequent retransmissions from the UE 102*a* do not occur, or the pilot of the subsequent transmission cannot be successfully decoded. Even if the unsuccessfully decoded data is combined with subsequent unsuccessfully decoded data from the same UE, there is a limited period of time during which this will occur. Therefore, eventually any unsuccessfully decoded data stored in memory 204 will become stale and is discarded by the base station 100. The amount of time unsuccessfully decoded data is stored in memory 204 may be configured by the base station 100. In one embodiment, the amount of time may be equal to the maximum amount of time it may take to receive the maximum number of retransmissions permitted by the UEs 102*a-n*.

In some embodiments, when data from UE 102*a* is successfully decoded by the base station 100, the successful decoding operation may be used to assist in decoding other grant-free uplink transmissions received from other UEs 102*b-n* using the same resources. A joint decoding algorithm, such as successive interference cancellation (SIC) may be used to help decode other signals by removing the successfully decoded signals.

In some embodiments, individual channel estimations from different uplink transmissions may assist in decoding. For example, if the initial pilot from an initial data transmission by UE 102a is successfully decoded but does not provide a good estimation of the uplink channel, e.g. because of a collision, and if the retransmission pilot from the retransmission of the data by UE 102a is also successfully decoded and does provide a good estimation of the uplink channel, then if the uplink channel conditions have not changed much between the initial transmission and the retransmission, e.g. if UE 102a is static, the channel estimation from the retransmission pilot may be used as the channel estimation from the initial transmission, which may enhance performance of the decoding algorithm and allow the data to be successfully decoded.

In some embodiments, retransmission mode information such as the mapping rules or tables defining the tuples, e.g. table 302, 304, or 306 in FIG. 3, may be broadcast by the base stations 100 to the UEs 102a-n. This retransmission mode information may include the additional information discussed above, such as the MCS for data transmitted with each pilot set and/or the UE transmit power to use for data transmitted with each pilot set and/or the resources to use for initial and retransmissions, and/or whether the retransmissions are to be synchronous or asynchronous. When UE 102a wants to transmit data in a grant-free uplink transmission, the UE 102a may then randomly choose one of the tuples, which will indicate which initial pilot and retransmission pilots to use for initial and retransmissions of the data. In some embodiments, the tuple is randomly chosen by randomly selecting a pilot from the initial pilot set or randomly selecting a pilot from the last retransmission pilot set. Alternatively, the UE 102a may choose the tuple to use for data to be transmitted based on a predefined rule, e.g. based on the ID of the UE 102a, such as UE ID modulo n. In other embodiments, the base station 100a may use signaling in a dedicated channel to assign one or more of the tuples to each one of UEs 102a-n. A possible benefit of assigning one or more of the tuples to each of the UEs 102a-n is that the base station 100 may ensure an even distribution of the tuples across the UEs 102a-n, and when a pilot is successfully decoded at the base station 100, the base station 100 will know that the data came from one of UEs 102a-n to which the base station 100 assigned the tuple having the pilot. A possible drawback of assigning one or more of the tuples to each of the UEs 102a-n is that each one of the UEs 102a-n is only limited to using the tuples actually assigned to that UE.

In embodiments in which UE 102a has two or more antennas, a different tuple may be used for each antenna of the UE 102a. If the UE 102a can operate in a MIMO mode, the base station 100 may facilitate MIMO mode operation by signaling to the UEs 102a-n that one or more subsets of tuples are to be used for MIMO mode only. For example, if the pilots are divided as in table 306 of FIG. 3, and two antenna MIMO mode is supported, then the pilot set creator 202 may designate 3-tuples 1 and 2 for a two-antenna MIMO transmission and designate 3-tuples 3 to 6 for non-MIMO mode transmission. Then, if the grant-free transmission decoder 206 successfully decodes a pilot from 3-tuple 1 or 2, the grant-free transmission decoder 206 knows the data sent with the pilot is a two-antenna MIMO transmission, and the grant-free transmission decoder 206 then decodes together the transmissions sent using tuples 1 and 2 to perform MIMO decoding. In some embodiments, when operating in MIMO mode, UE 102a may select a single pilot for a MIMO grant-free uplink data transmission and apply an OCC to the selected pilot to obtain a plurality of pilots, one for each of the transmission antennas of the UE 102a. When one of the plurality of pilots was successfully decoded at the base station 100, the base station 100 would identify the successfully decoded pilot as a MIMO transmission pilot and perform MIMO decoding.

Possible benefits of some embodiments above include the following. No additional signalling overhead in packets is used to indicate retransmissions, and no packet structure changes are made for initial and retransmissions, because the pilots are used for identifying initial and/or retransmissions of data from the same UE. A pilot is included anyway for estimation of the uplink channel. Using the pilot to also identify a previous transmission of the data, as described above, is additionally disclosed. A hybrid automatic repeat request (HARQ) combining scheme may be provided for grant-free uplink transmissions, but without a UE ID to perform the HARQ combining because the pilots are used to identify previous transmissions of the data instead. The combining is opportunistic joint signal detection for grant-free transmissions. The multiple transmission signals to be HARQ combined at the base station 100 for decoding are identified from different and associated pilot sequences. When the HARQ combining is successful, the successfully decoded data may help with decoding of data in other transmissions from other UEs, e.g. through SIC, and thereby possibly successfully decode other data from other UEs that was originally unsuccessfully decoded at the base station. Grant-free link adaptation may be provided by mapping multiple pilots uniquely to different modulation schemes, in which one pilot may uniquely represent one different modulation of data being transmitted in a grant-free uplink transmission. There may be reduced impact on and fewer changes in the UE because the UE needs to send a pilot anyway for uplink channel estimation. Multiple access schemes, such as OFDMA and sparse code multiple access (SCMA) may still be supported. Both asynchronous and synchronous retransmission schemes may be supported. Some embodiments may be well suited to massive connectivity cases in which there are many UEs that transmit short bursty packets.

Finally, grant-free link adaptation is discussed in some embodiments above, but in the context of some of the pilots being used for data retransmissions. However, grant-free link adaptation is possible even in schemes in which no retransmissions occur or no retransmissions are allowed, and even in schemes in which the pilot is not used to identify a previous initial transmission or a previous retransmission coming from the same UE. Specifically, a set of pilots {P} may be divided into a plurality of groups of pilots {$P_A$}, {$P_B$}, {$P_C$}, . . . . . Each group may be associated with a different data MCS. For example, when a message is transmitted from UE 102a carrying data and a pilot from {$P_A$}, then a first MCS is used for the data, when a message is transmitted from UE 102a having data and a pilot from {$P_B$}, then a second MCS is used for the data, and so on. Then, when the base station 100 successfully decodes the pilot, the base station 100 can determine which MCS was used for the data based on which group the pilot is from.

In operation, when the UE 102a is to transmit data to the base station 100 via a grant-free uplink transmission, the UE 102a determines which MCS to use for the data, and then selects a pilot from a group corresponding to that MCS. The UE 102a then sends the grant-free uplink transmission carrying the selected pilot and carrying the data having the MCS associated with the group the selected pilot is from. When the base station 100 receives the grant-free uplink transmission and successfully decodes the pilot, the base station 100 determines from the identity of the pilot what the MCS is of the data in the grant-free uplink transmission. The base station 100 then decodes the data in the grant-free uplink transmission using knowledge of the MCS of the data. Hence, the pilot is used to identify the MCS of the data. The embodiment is still applicable even in schemes in which no retransmissions occur or no retransmissions are allowed, and even in schemes in which the pilot is not used to identify a previous initial transmission or a previous retransmission coming from the same UE.

Both the base station 100 and the UE 102a have knowledge of which pilots belong to which groups, as well as the data MCS associated with each group. As one example, the base station 100 may partition the set of pilots {P} into the groups {$P_A$}, {$P_B$}, {$P_C$} and decide which data MCS is associated with each group, and then the base station 100 may store in memory 204 information indicating the groups {$P_A$}, {$P_B$}, {$P_C$} and the data MCS associated with each group. This information may also be transmitted from the base station 100 to the UE 102a.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method performed by a user equipment (UE), the method comprising:
    transmitting an initial grant-free uplink transmission, the initial grant-free uplink transmission carrying data and an initial pilot sequence;
    without waiting for feedback in relation to the initial grant-free uplink transmission: transmitting a first retransmission of the initial grant-free uplink transmission, the first retransmission carrying the data and a first retransmission pilot sequence, wherein the first retransmission pilot sequence is different from the initial pilot sequence, and wherein the initial pilot sequence and the first retransmission pilot sequence identify the initial grant-free uplink transmission and the first retransmission as both originating from the UE;
    wherein the first retransmission pilot sequence and the initial pilot sequence identify the UE, and wherein the initial grant-free uplink transmission and the first retransmission use transmission resources not dynamically requested by the UE;
    transmitting a second retransmission of the initial grant-free uplink transmission, the second retransmission carrying the data and a second retransmission pilot sequence;
    wherein the initial pilot sequence, the first retransmission pilot sequence, and the second retransmission pilot sequence have an association with the user equipment in the form of a mapping between the initial pilot sequence, the first retransmission pilot sequence, and the second retransmission pilot sequence;
    wherein the initial pilot sequence identifies the initial grant-free uplink transmission as specifically being an initial transmission of the data, wherein the first retransmission pilot sequence identifies the first retransmission as specifically being the first retransmission of the data, and wherein the second retransmission pilot sequence identifies the second retransmission as specifically being the second retransmission of the data.

2. The method of claim 1, further comprising selecting the first retransmission pilot sequence using the mapping.

3. The method of claim 2, wherein:
    the initial pilot sequence is from a set of initial transmission pilot sequences;
    the first retransmission pilot sequence is from a set of retransmission pilot sequences;
    mapping information between the set of initial transmission pilot sequences and the set of retransmission pilot sequences is known by the UE, the mapping information comprising, for each pilot sequence in the set of initial transmission pilot sequences, a mapping between the pilot sequence in the set of initial transmission pilot sequences and a corresponding pilot sequence in the set of retransmission pilot sequences; and
    the mapping information includes the mapping between the initial pilot sequences and the retransmission pilot sequences.

4. A method performed by a base station, comprising:
    receiving a first grant-free uplink transmission on an uplink channel, wherein the first grant-free uplink transmission carries initial data and an initial pilot sequence;

without the base station transmitting feedback in relation to the first grant-free uplink transmission: receiving a second grant-free uplink transmission carrying first retransmission data and a first retransmission pilot sequence, wherein the first retransmission pilot sequence is different from the initial pilot sequence, and wherein the initial pilot sequence and the first retransmission pilot sequence identify the first grant-free uplink transmission and the second grant-free uplink transmission as originating from a same user equipment;

receiving a third grant-free uplink transmission carrying second retransmission data from the user equipment and a second retransmission pilot sequence;

wherein the initial pilot sequence, the first retransmission pilot sequence, and the second retransmission pilot sequence have an association with the user equipment in the form of a mapping between the initial pilot sequence, the first retransmission pilot sequence, and the second retransmission pilot sequence;

wherein the initial pilot sequence identifies the first grant-free uplink transmission as specifically being an initial transmission carrying the initial data, wherein the first retransmission pilot sequence identifies the second grant-free uplink transmission as specifically being a first retransmission carrying the first retransmission data, and wherein the second retransmission pilot sequence identifies the third grant-free uplink transmission as specifically being a second retransmission carrying the second retransmission data.

5. The method of claim 4, further comprising identifying the initial pilot sequence from the first retransmission pilot sequence and soft-combining data associated with the initial pilot sequence and the first retransmission pilot sequence.

6. The method of claim 4, further comprising soft-combining multiple transmissions of data originating from the same user equipment after using the mapping in order to identify that the multiple transmissions are related.

7. The method of claim 4, wherein the mapping is:
pre-defined and pre-configured without base station configuration signaling; or configured by the base station via a dedicated channel.

8. The method of claim 4, further comprising the base station:
successfully decoding the initial pilot sequence and unsuccessfully decoding the initial data;
successfully decoding the first retransmission pilot sequence;
using the successfully decoded first retransmission pilot sequence to identify the successfully decoded initial pilot sequence and the unsuccessfully decoded initial data associated with the successfully decoded initial pilot sequence;
retrieving the unsuccessfully decoded initial data; and
using the first retransmission data and the unsuccessfully decoded initial data to attempt to decode data from the user equipment.

9. The method of claim 8, wherein using the successfully decoded first retransmission pilot sequence to identify the successfully decoded initial pilot sequence comprises: using the mapping to identify the user equipment that sent the first grant-free uplink transmission and the second grant-free uplink transmission.

10. The method of claim 8, further comprising unsuccessfully decoding the first retransmission data; and wherein using the first retransmission data and the unsuccessfully decoded initial data to attempt to decode the data from the user equipment comprises soft combining the unsuccessfully decoded first retransmission data and the unsuccessfully decoded initial data.

11. The method of claim 4, wherein the initial data has a first modulation and coding scheme (MCS) that is associated with the initial pilot sequence, and the first retransmission data has a second MCS that is associated with the first retransmission pilot sequence.

12. The method of claim 11, wherein the first MCS is different from the second MCS.

13. A base station, comprising:
at least one antenna; and
a memory;
the at least one antenna configured to:
receive a first grant-free uplink transmission on an uplink channel, wherein the first grant-free uplink transmission carries initial data and an initial pilot sequence; and
without the base station transmitting feedback in relation to the first grant-free uplink transmission:
receive a second grant-free uplink transmission carrying first retransmission data and a first retransmission pilot sequence, wherein the first retransmission pilot sequence is different from the initial pilot sequence, and wherein the initial pilot sequence and the first retransmission pilot sequence identify the first grant-free uplink transmission and the second grant-free uplink transmission as originating from a same user equipment;
receive a third grant-free uplink transmission carrying second retransmission data from the user equipment and a second retransmission pilot sequence;
wherein the initial pilot sequence, the first retransmission pilot sequence, and the second retransmission pilot sequence have an association with the user equipment in the form of a mapping between the initial pilot sequence, the first retransmission pilot sequence, and the second retransmission pilot sequence;
wherein the initial pilot sequence identifies the first grant-free uplink transmission as specifically being an initial transmission carrying the initial data, wherein the first retransmission pilot sequence identifies the second grant-free uplink transmission as specifically being a first retransmission carrying the first retransmission data, and wherein the second retransmission pilot sequence identifies the third grant-free uplink transmission as specifically being a second retransmission carrying the second retransmission data.

14. The base station of claim 13, further comprising a grant-free transmission module configured to identify the initial pilot sequence from the first retransmission pilot sequence and soft-combine data associated with the initial pilot sequence and the first retransmission pilot sequence.

15. The base station of claim 13, further comprising a grant-free transmission module configured to soft-combine multiple transmissions of data originating from the same user equipment after using the mapping in order to identify that the multiple transmissions are related.

16. The base station of claim 13, wherein the mapping is:
pre-defined and pre-configured without base station configuration signaling; or
configured by the base station via a dedicated channel.

17. The base station of claim 13, further comprising a grant-free transmission module, and wherein:
the grant-free transmission module is configured to attempt to decode the initial pilot sequence and the initial data, and when the initial pilot sequence is successfully decoded and the initial data is unsuccessfully decoded, then the grant-free transmission module is further configured to store in the memory the successfully decoded initial pilot sequence and the unsuccessfully decoded initial data;

the grant-free transmission module is configured to attempt to decode the first retransmission pilot sequence and when the first retransmission pilot sequence is successfully decoded the grant-free transmission module is further configured to:

use the successfully decoded first retransmission pilot sequence to identify the successfully decoded initial pilot sequence in the memory and the unsuccessfully decoded initial data associated with the successfully decoded initial pilot sequence;

retrieve the unsuccessfully decoded initial data from the memory; and use the first retransmission data and the unsuccessfully decoded initial data to attempt to decode data from the user equipment.

18. The base station of claim 17, wherein the grant-free transmission module is configured to use the first retransmission data and the unsuccessfully decoded initial data to successfully attempt to decode the data from the user equipment by: soft combining the decoded first retransmission data and the unsuccessfully decoded initial data.

19. The base station of claim 17, wherein the grant-free transmission module is configured to use the successfully decoded first retransmission pilot sequence to identify the successfully decoded initial pilot sequence by: using the mapping to identify the user equipment that sent the first grant-free uplink transmission and the second grant-free uplink transmission.

20. The base station of claim 13, wherein the initial data has a first modulation and coding scheme (MCS) that is associated with the initial pilot sequence, and the first retransmission data has a second MCS that is associated with the first retransmission pilot sequence.

21. The base station of claim 20, wherein the first MCS is different from the second MCS.

22. A method performed by a user equipment, comprising:
transmitting a first grant-free uplink transmission on an uplink channel, wherein the first grant-free uplink transmission carries initial data from the user equipment and an initial pilot sequence;

without waiting for feedback in relation to the first grant-free uplink transmission: transmitting a second grant-free uplink transmission carrying first retransmission data from the user equipment and a first retransmission pilot sequence, wherein the first retransmission pilot sequence is different from the initial pilot sequence, and wherein the initial pilot sequence and the first retransmission pilot sequence identify the first grant-free uplink transmission and the second grant-free uplink transmission as both originating from the user equipment;

transmitting a third grant-free uplink transmission carrying second retransmission data from the user equipment and a second retransmission pilot sequence;

wherein the initial pilot sequence, the first retransmission pilot sequence, and the second retransmission pilot sequence have an association with the user equipment in the form of a mapping between the initial pilot sequence, the first retransmission pilot sequence, and the second retransmission pilot sequence;

wherein the initial pilot sequence identifies the first grant-free uplink transmission as specifically being an initial transmission carrying the initial data, wherein the first retransmission pilot sequence identifies the second grant-free uplink transmission as specifically being a first retransmission carrying the first retransmission data, and wherein the second retransmission pilot sequence identifies the third grant-free uplink transmission as specifically being a second retransmission carrying the second retransmission data.

23. The method of claim 22, wherein the mapping is: pre-defined and pre-configured without base station configuration signaling; or configured by the base station via a dedicated channel.

24. The method of claim 22, wherein the initial data has a first modulation and coding scheme (MCS) that is associated with the initial pilot sequence, and the first retransmission data has a second MCS that is associated with the first retransmission pilot sequence.

25. The method of claim 24, wherein the first MCS is different from the second MCS.

26. A user equipment comprising:
at least one antenna; and
a memory;
the at least one antenna configured to:
transmit a first grant-free uplink transmission on an uplink channel, wherein the first grant-free uplink transmission carries initial data from the user equipment and an initial pilot sequence;

without waiting for feedback in relation to the first grant-free uplink transmission: transmit a second grant-free uplink transmission carrying first retransmission data from the user equipment and a first retransmission pilot sequence, wherein the first retransmission pilot sequence is different from the initial pilot sequence, and wherein the initial pilot sequence and the first retransmission pilot sequence identify the first grant-free uplink transmission and the second grant-free uplink transmission as both originating from the user equipment;

transmit a third grant-free uplink transmission carrying second retransmission data from the user equipment and a second retransmission pilot sequence;

wherein the initial pilot sequence, the first retransmission pilot sequence, and the second retransmission pilot sequence have an association with the user equipment in the form of a mapping between the initial pilot sequence, the first retransmission pilot sequence, and the second retransmission pilot sequence;

wherein the initial pilot sequence identifies the first grant-free uplink transmission as specifically being an initial transmission carrying the initial data, wherein the first retransmission pilot sequence identifies the second grant-free uplink transmission as specifically being a first retransmission carrying the first retransmission data, and wherein the second retransmission pilot sequence identifies the third grant-free uplink transmission as specifically being a second retransmission carrying the second retransmission data.

27. The user equipment of claim 26, wherein the mapping is: pre-defined and pre-configured without base station configuration signaling; or configured by the base station via a dedicated channel.

28. The user equipment of claim 26, wherein the initial data has a first modulation and coding scheme (MCS) that is associated with the initial pilot sequence, and the first retransmission data has a second MCS that is associated with the first retransmission pilot sequence.

29. The user equipment of claim 28, wherein the first MCS is different from the second MCS.

\* \* \* \* \*